United States Patent [19]

Yue

[11] 4,011,092
[45] Mar. 8, 1977

[54] STANNOUS SULFATE AND GYPSUM MIXTURE AS A RETARDER IN GRINDING PORTLAND CEMENT AND BLENDED HYDRAULIC CEMENT FOR IMPROVING THE QUALITY OF THE CEMENT, MORTAR AND CONCRETE

[76] Inventor: Sing Tsze Yue, 129 Wanda Court, Santa Cruz, Calif. 95065

[22] Filed: Feb. 11, 1976

[21] Appl. No.: 657,160

[52] U.S. Cl. .................................. 106/89; 106/315
[51] Int. Cl.² ...................... C04B 7/02; C04B 7/35
[58] Field of Search .............................. 106/315, 89

[56] References Cited

UNITED STATES PATENTS

| | | | |
|---|---|---|---|
| 3,429,724 | 2/1969 | Keenum et al. | 106/315 |
| 3,782,991 | 1/1974 | Burge | 106/315 |

*Primary Examiner*—J. Poer
*Attorney, Agent, or Firm*—Leslie M. Hansen

[57] ABSTRACT

A process for retarding the hardening rate of the portland cement and blended hydraulic cement by grinding from about 0.5 to 5.0 weight percent of stannous sulfate based on the dry weight of cement clinker in substitution a portion of gypsum as normally used to eliminate the possibility of false set occuring in ground cement and also improve their qualities.

11 Claims, No Drawings

STANNOUS SULFATE AND GYPSUM MIXTURE AS A RETARDER IN GRINDING PORTLAND CEMENT AND BLENDED HYDRAULIC CEMENT FOR IMPROVING THE QUALITY OF THE CEMENT, MORTAR AND CONCRETE

BACKGROUND OF THE INVENTION

This invention deals with the improvement of the cement mortar and concrete, particularly the false set in ground cement and its contraction. The term "cement" as used herein is understood to be the known five types of portland cement and blended hydraulic cement; such as blast-furnace cement, slag cement, fly-ash cement and portland-pozzolan cement. It is the object of this invention to improve the retarder in cement by reducing the amount of gypsum used and substituting from about 0.5 to 5.0 weight percent of stannous sulfate to the cement clinker in the process and manufacture.

Gypsum ($CaSO_4 \cdot 2H_2O$) is commonly used in the amount between 3 to 7% by weight of cement clinkers as a retarder to regulate the hardening rate of cement, but also causes many problems in modern cement manufacturing. During the process of grinding cement clinker, the friction inside the grinding mill generates heat. When it reaches to a certain temperature, the heat will cause the gypsum to dehydrate to form calcium hemihydrate ($CaSO_4 \cdot \frac{1}{2}H_2O$) or soluble calcium sulfate ($CaSO_4$) or both, which upon the addition of water dissolves rapidly and precipitates as gypsum to produce a false set, otherwise known as premature stiffening in a hydrated cement. Sometimes the false set occurs in the product after being aerated or in storage. Since only a small amount of the total mixing water is required for the recrystalization of gypsum, the stiffened mix can be reworked to its original plastic condition with little loss of its workability. In some worst cases, they are not reworkable back to their original workabilities. By reducing the amount of gypsum to a minimum from about 1 to 3 percent and substituting the easily soluble stannous sulfate to regulate the hardening rate, much less dehydrated gypsum product can possibly be formed to cause a false set to occur in the mortar or concrete during hydration of the cement when mixed with water.

The major compounds found in portland cement are tricalcium silicate, dicalcium silicate, tricalcium aluminate and tetracalcium aluminoferrite. The tricalcium silicate and dicalcium silicate both reacts with water to form hydrated calcium silicate known as tobermorite and calcium hydroxide but the latter reacts at a much lower rate of reaction. Tricalcium aluminate contributes to the hardening rate of the cement, and to cause the hydrates to form hydrated calcium aluminate and calcium hydroxide. In a solution containing calcium sulfate from gypsum which is saturated with calcium hydroxide, tricalcium aluminate will form either a high or a low sulfate form of calcium sulfoaluminate. This change of aluminate to sulfoaluminate retards the hardening rate of the cement. Tetracalcium aluminoferrite which reacts less instantaneously than the tricalcium aluminate, may be expected to form a solid solution of the high sulfate form of sulfoaluminate and sulfoferrite.

In view of the hydration of the major compounds in cement, every compound gives off a similar calcium hydroxide as a final product. Thus a hydrated cement is highly alkaline and saturated with calcium hydroxide. In a calcium hydroxide solution, stannous sulfate precipitates as stannous hydroxide, but in a solution highly saturated with calcium hydroxide, stannous hydroxide tends to form stannous oxide plus water as in the following equations:

$$SnSO_4 + Ca(OH)_2 = Sn(OH)_2 + CaSO_4$$

$$Sn(OH)_2 = SnO + H_2O$$

It is indicated that the use of stannous sulfate, water is formed instead of hydroxide during the hydration, thus reduces the mixing water used for cement mortar and concrete.

The cause of shrinkage in cement has not been clearly determined. There are various theories which fall into three groups: The capillary tension theory, surfaced adsorption of water and interlayer water in crystals. It has been experienced that during the shrinkage of cement mortar and concrete, moisture is lost. Another experienced phenomenon is that cement consists of the same chemical composition with the same mixture composed of the same kind of sand and gravel, does not give the same shrinkage. Even the difference in size of a clinker, in the same product from the kiln, has a different shrinkage. The explanation for such experience has to trace back to the burning of cement clinker. Aside from the composition of a cement clinker, the process of burning is one of the main factors in the manufacture of a good quality cement. The structure of silicate varies in the degree of burning, thus varies its hydration. There are many factors in the operation of a kiln. The temperature of the burning zone, the rate of the kiln revolution and the retention time of clinker in the burning zone which varies the size of clinker; and the proper clinker cooling are the essential requirements to determine the quality of a good clinker. This invention of using stannous sulfate reduces the use of gypsum, thus decreases the formation of calcium hydroxide and the water requirement for hydration process; therefore less water is lost during the shrinkage process.

SUMMARY OF THE INVENTION

The stannous sulfate can be added to the cement in various methods. Preferably by adding from about 1 to 3 weight percent gypsum and from about 1 to 3 weight percent stannous sulfate to cement clinker prior to grinding and the mixture can be ground to a cement product. It can also be added to a low gypsum content cement as a preground dry powder or water solution of such sulfate, and the ingredients then thoroughly mixed to uniformly disperse the active ingredients.

The following specific examples will serve to further illustrate the improvement of the cement and mortar.

EXAMPLE 1

This example indicates that the mixture of gypsum and stannous sulfate after interground with cement clinker, does not impair the setting time. The method for this test used, was applying the procedure of ASTM C191. The results are shown in the following Table I:

TABLE I

| Cement | % Retarders | | Water Cement | Final Setting | |
|---|---|---|---|---|---|
| | Gypsum | $SnSO_4$ | | | |
| 1 | 5.5 | None | 0.2400 | 5 hrs. | 30 min. |
| 1 | 1.7 | 1.3 | 0.2275 | 5 hrs. | 35 min. |
| 2 | 5.0 | None | 0.2350 | 6 hrs. | 10 min. |

TABLE I-continued

| Cement | % Retarders | | Water Cement | Final Setting | |
| --- | --- | --- | --- | --- | --- |
| | Gypsum | SnSO$_4$ | | | |
| 2 | 1.7 | 1.3 | 0.2225 | 6 hrs. | 0 min. |

EXAMPLE 2

This example shows that cement ground with gypsum and stannous sulfate mixture does not show any sign of false setting. ASTM C451 procedure was used for this test. The results are listed in Table II:

TABLE II

| Cement | % Retarders | | Penetration in mins. | | |
| --- | --- | --- | --- | --- | --- |
| | Gypsum | SnSO$_4$ | Initial | 5 min. | 10 min. |
| 1 | 5.5 | None | 37 | 28 | 20 |
| 1 | 1.7 | 1.3 | 38 | 38 | 37 |
| 2 | 5.0 | None | 36 | 28 | 18 |
| 2 | 1.7 | 1.3 | 37 | 37 | 37 |

EXAMPLE 3

This example demonstrates that the compressive strength of the cement is improved by the use of mixture of gypsum and stannous sulfate. It also shows that portland-pozzolan cement prepared by adding 20% calcined shale and a mixture of gypsum and stannous sulfate with cement clinker to make up the remaining 80%, then ground to form a fine homogeneous cement, the strength was also increased.

The ASTM C109 was adopted for the test. The results are shown in Table III:

TABLE III

| Cement | % Retarders | | Water Cement | 7-day Strength |
| --- | --- | --- | --- | --- |
| | Gypsum | SnSO$_4$ | | |
| 1 | 5.5 | None | 0.485 | 246 kg/cm$^2$ |
| 1 | 1.7 | 1.3 | 0.460 | 273 kg/cm$^2$ |
| Portland-Pozzolan | 6.5 | None | 0.595 | 232 kg/cm$^2$ |
| Portland-Pozzolan | 1.7 | 2.0 | 0.545 | 266 kg/cm$^2$ |

EXAMPLE 4

This example proves that the contraction of the cement mortar made by 1 part cement and 2 parts graded standard sand was reduced by using the mixture of less gypsum with stannous sulfate as a retarder. The procedure of California State Test No. 527 by Department of Public Works, Division of Highway, was used. The results are tabulated in Table IV:

TABLE IV

| Cement | % Retarder | | W/C | Expansion in Water | Contraction in Days | | | |
| --- | --- | --- | --- | --- | --- | --- | --- | --- |
| | Gypsum | SnSO$_4$ | | | 7 | 14 | 21 | 28 |
| 1 | 5.5 | None | 0.375 | 0.003 | 0.043 | 0.067 | 0.080 | 0.087 |
| 1 | 1.7 | 1.3 | 0.350 | 0.003 | 0.044 | 0.064 | 0.072 | 0.076 |
| 2 | 5.0 | None | 0.375 | 0.003 | 0.047 | 0.075 | 0.089 | 0.098 |
| 2 | 1.7 | 1.3 | 0.350 | 0.002 | 0.044 | 0.064 | 0.075 | 0.082 |

EXAMPLE 5

Portland-pozzolan cement is an ideal cement serving the purpose of all types of cement, except for Type III — high early strength. It is produced by intergrinding 20 to 30 weight percent of active pozzolanic material with cement clinker and the required retarder. This blended cement is the cheapest to produce.

This example indicates that the contraction of the portland-pozzolan cement mortar consists of 20% calcined shale using gypsum and stannous sulfate mixture, was reduced much better than the above cement mortar. The test procedure was the same as Example 4. The results are given in Table V:

TABLE V

| Portland-Pozzolan | % Retarder | | W/C | Expansion in Water | Contraction in Days | | | |
| --- | --- | --- | --- | --- | --- | --- | --- | --- |
| | Gypsum | SnSO$_4$ | | | 7 | 14 | 21 | 28 |
| A | 6.5 | None | 0.460 | 0.003 | 0.067 | 0.102 | 0.115 | 0.123 |
| A | 1.7 | 2.0 | 0.420 | 0.001 | 0.052 | 0.069 | 0.078 | 0.085 |
| B | 6.2 | None | 0.465 | 0.005 | 0.076 | 0.112 | 0.129 | 0.139 |
| B | 1.7 | 2.0 | 0.425 | 0.004 | 0.058 | 0.077 | 0.089 | 0.096 |

Evidently, many modifications and variations of the invention as described above may be applied without departing from the principle. In the following, the term "cement clinker" is defined as portland cement clinker, and the term "blended clinker" is specified as a mixture of portland cement clinker and pozzolanic materials to produce the group of blended hydraulic cements. It is distinctly understood that only those limitations should be used as in the scope of the following claims.

What I claim is:

1. A process for producing a cement mixture comprising:
   1. a base of cement clinker;
   2. mixing a retarder of not more than 3% of gypsum and from about 0.5 to 5.0% stannous sulfate based on the dry weight of the cement clinker, with the latter and;
   3. grinding the mixture to form a fine homogeneous cement.

2. The process of producing a cement mixture in accordance with claim 1 in which said cement clinker is a blended clinker.

3. A process for producing a cement mixture comprising:
   1. a base of cement clinker;
   2. grinding the cement clinker to a fine homogeneous cement;
   3. adding thereto from about 1 to 3% of gypsum and from about 0.5 to 5.0% stannous sulfate mixture as a preground dry powder based on the dry weight of the fine homogeneous cement; and
   4. mixing thoroughly the components of the mixture to form a cement.

4. The process of producing a cement mixture in accordance with claim 3 in which said clinker is a blended clinker.

5. A process for producing a cement mixture comprising:
   1. a base of cement clinker;
   2. mixing therewith from about 1 to 3% of gypsum based on the dry weight of cement clinker;
   3. grinding the foregoing mixture to form a fine homogeneous cement mixture;
   4. adding to the ground cement mixture from about 0.5 to 5.0% of stannous sulfate as a preground powder based on the dry weight of the ground cement mixture; and
   5. thoroughly mixing all of the components of the mixture.

6. The process of producing a cement mixture in accordance with claim 5 in which said clinker is a blended clinker.

7. A process for producing a cement mixture comprising:
   1. a cement clinker;
   2. mixing therewith from about 1 to 3% of gypsum based on the dry weight of the cement clinker;
   3. grinding the mixture to form a fine homogeneous cement; then
   4. adding to the ground cement a solution of stannous sulfate from about 0.5 to 5.0% based on the dry weight of the ground cement; and
   5. thoroughly mixing all of the components of the mixture.

8. The process of producing a cement mixture in accordance with claim 7 in which said clinker is a blended clinker.

9. A cement composition consisting essentially of a cement having a retarder of gypsum and stannous sulfate.

10. The cement composition as in claim 9 in which the cement is a fine ground cement clinker.

11. The cement composition as in claim 10 in which the fine ground cement clinker is a blended clinker.

* * * * *